US011668678B1

(12) United States Patent
Galloup

(10) Patent No.: US 11,668,678 B1
(45) Date of Patent: Jun. 6, 2023

(54) MATERIAL SELECTION SYSTEM AND METHOD FOR CONSTRUCTING A MUSICAL INSTRUMENT

(71) Applicant: Bryan John Galloup, Big Rapids, MI (US)

(72) Inventor: Bryan John Galloup, Big Rapids, MI (US)

( * ) Notice: Subject to any disclaimer, the term of this patent is extended or adjusted under 35 U.S.C. 154(b) by 760 days.

(21) Appl. No.: 16/569,328

(22) Filed: Sep. 12, 2019

Related U.S. Application Data

(60) Provisional application No. 62/730,513, filed on Sep. 12, 2018.

(51) Int. Cl.
*G01N 29/12* (2006.01)
*G01N 29/04* (2006.01)
(Continued)

(52) U.S. Cl.
CPC .......... *G01N 29/12* (2013.01); *G01N 29/041* (2013.01); *G01N 29/4472* (2013.01);
(Continued)

(58) Field of Classification Search
CPC ..... G01N 2291/014; G01N 2291/0238; G01N 2291/102; G01N 2291/2698;
(Continued)

(56) References Cited

U.S. PATENT DOCUMENTS 4,926,350 A * 5/1990 Bechtel .................. G01N 33/46
209/517
5,060,516 A 10/1991 Lau et al.
(Continued)

FOREIGN PATENT DOCUMENTS

| CN | 101793873 A | * | 8/2010 | |
| WO | WO-9613702 A1 | * | 5/1996 | ............. G01H 15/00 |
| WO | WO-2010148431 A1 | * | 12/2010 | ............... G10D 3/02 |

OTHER PUBLICATIONS

Catgut Acoustical Society Journal vol. 2, No. 7 (Series II) May 1995 (Year: 1995).*
(Continued)

*Primary Examiner* — David L Singer
(74) *Attorney, Agent, or Firm* — The Law Office of Patrick F. O'Reilly III, LLC

(57) ABSTRACT

Material selection systems and methods for constructing a musical instrument and/or where a selected material is a wood material are disclosed. One example material selection system includes a rating module and a rating database. The rating module includes an excitation device configured to act upon material samples; a vibration receiver in cooperation with the excitation device; a rating computer coupled to the vibration receiver, the rating computer configured to execute stored instructions for determining a set of material sample ratings based on FFT analysis of data collected by the vibration receiver; and an output device operatively coupled to the rating computer, the output device configured to output the determined set of material sample ratings to a rating database. Each set of material sample ratings is associated with a material sample. Another example material selection system may further include a selection module with a selection computer coupled to the rating database.

9 Claims, 15 Drawing Sheets

(51) Int. Cl.
G01N 29/44 (2006.01)
G01N 29/46 (2006.01)
G10D 1/08 (2006.01)
G06F 17/14 (2006.01)
G01N 29/22 (2006.01)

(52) U.S. Cl.
CPC .............. *G01N 29/46* (2013.01); *G10D 1/08* (2013.01); *G01N 29/223* (2013.01); *G01N 2291/014* (2013.01); *G01N 2291/0238* (2013.01); *G01N 2291/102* (2013.01); *G01N 2291/2698* (2013.01); *G06F 17/142* (2013.01); *Y10T 29/49574* (2015.01)

(58) Field of Classification Search
CPC .... G01N 29/041; G01N 29/12; G01N 29/223; G01N 29/4472; G01N 29/46; G06F 17/142; G10D 1/08; Y10T 29/49574
See application file for complete search history.

(56) References Cited

U.S. PATENT DOCUMENTS

| | | | |
|---|---|---|---|
| 5,544,256 A | 8/1996 | Brecher et al. | |
| 6,087,568 A * | 7/2000 | Seal | G10D 3/22 84/193 |
| 6,220,743 B1 * | 4/2001 | Campestre | G06Q 10/06 700/98 |
| 6,320,113 B1 * | 11/2001 | Griffin | G10D 3/00 84/738 |
| 6,667,429 B2 | 12/2003 | Abe et al. | |
| 6,779,404 B1 | 8/2004 | Brincker et al. | |
| 6,782,732 B2 | 8/2004 | Huang et al. | |
| 7,005,570 B2 | 2/2006 | Nishitani et al. | |
| 7,406,190 B2 | 7/2008 | Carman et al. | |
| 7,426,422 B2 | 9/2008 | Carman et al. | |
| 8,655,628 B2 | 2/2014 | Cone | |
| 9,349,354 B1 | 5/2016 | Galloup | |
| 9,502,006 B1 | 11/2016 | Galloup | |
| 2003/0066412 A1 | 4/2003 | Nishitani et al. | |
| 2005/0011263 A1 | 1/2005 | Harris | |
| 2014/0100825 A1 * | 4/2014 | Summit | G06F 30/00 703/1 |

OTHER PUBLICATIONS

Aramaki et al., Controlling the Perceived Material in an Impact Sound Synthesizer, IEEE Transactions on Audio, Speech, and Language Processing, vol. 19, No. 2, Feb. 2011 (Year: 2011).*
LucchiMeter.com, Wayback Machine 2016 archived version (Year: 2016).*
Carlier et al, Revisiting the notion of "resonance wood" choice: a de-compartementalised approach from violin makers' opinion and perception to characterization of material properties' variability, (Year: 2019).*
Pioneer Hill Software LLC, SpectraPLUS (Year: 2016).*
Kitto, AC 2008-354: Teaching Basic Materials Engineering Design to Engineering Technology Students Using Stringed Instrument Top Design, American Society for Engineering Education, 2008 (Year: 2008).*
Fender Custom Shop, Tone Wood: Necks, YouTube https://www.youtube.com/watch?v=rAxvKw-wg-Y Transcript (Year: 2012).*
Tony Oldham, Acoustical Properties of Woods, Our Pastimes (Year: 2017).*
Spycher et al, Assessment of resonance wood quality by comparing its physical and histological properties, Wood Sci Technol (2008) 42:325-342 DOI 10.1007/s00226-007-0170-5 (Year: 2008).*
Chris Mcarthy, Idioms using numbers, EC English Language Centres (Year: 2008).*
Perfect 10—Idioms, The Free Dictionary (Year: 2022).*
Miao, Y., Zhong, M., Liu, Z., and Sun, F., "Analysis of wood vibration energy attenuation based on FFT vibration signal", BioResources, vol. 10(1), pp. 272-281, published Nov. 17, 2014.
A. Danihelová et al. "Modified Wood of Black Locust—Alternative to Honduran Rosewood in the Production of Xylophones", Acta Physica Polonica A, vol. 127(1), pp. 106-109 (Jan. 2015).
"Voicing and Tap Tuning of Acoustic Guitars", Dogwood Guitars Website, Web page <http://dogwoodguitars.com/voicing-and-tap-tuning/>, 8 pages, dated at least as early as Jul. 8, 2015, retrieved from dogwoodguitars.com website on Oct. 27, 2022.

* cited by examiner

Figure 15

MATERIAL SELECTION SYSTEM AND METHOD FOR CONSTRUCTING A MUSICAL INSTRUMENT

CROSS-REFERENCE TO RELATED APPLICATIONS

This patent application claims priority to, and incorporates by reference in its entirety, U.S. Provisional Patent Application No. 62/730,513, entitled "Material Selection System And Method", filed on Sep. 12, 2018.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

Technical Field

The present invention generally relates to systems and methods for selecting materials for constructing a musical instrument. More particularly, the present invention relates to systems and methods that employ conducting a fast Fourier transform ("FFT") analysis for each of a plurality of material samples, storing FFT analysis results of the plurality of material samples in a database, and recommending a specific one of the plurality of samples for use in constructing a musical instrument.

Background and Description of Related Art

Tones produced by an acoustic musical instrument are greatly influenced by the characteristics and qualities of the materials from which the instrument is constructed. Traditionally, acoustic musical instruments have been constructed from various types of wood, such as, for example, spruce, cedar, mahogany, maple, rosewood, as well as various exotic woods. Each type of wood may be selected, at least in part, for its appearance, material properties, acoustic properties, cost, rarity or other considerations.

For many musicians, acoustic properties are of primary importance in material selection. For luthiers, instrument builders, considerations of physical properties, such as strength, flexibility and elasticity, for example, are also important for material selection to ensure durability and structural soundness of the instrument. Of course, the location and function of a particular component is also an important consideration in material selection.

Regardless of the general characteristics of a particular species of wood, each specific sample of wood has its own unique characteristics and considerations. For example, a specific sample of wood may have been subjected to environmental factors that have changed the quality of the wood, for better or worse, so that it no longer falls within expected tolerances for its particular variety or species.

Accordingly, a need therefore exists for a system that selects a specific material sample for use in constructing an acoustic musical instrument based on a user's preferred characteristics. A further need exists for a system that rates a specific material sample for use in constructing an acoustic musical instrument.

SUMMARY OF EXAMPLE EMBODIMENTS

Accordingly, the present invention is directed to a material selection system and a method for selecting a material that substantially obviates one or more problems resulting from the limitations and deficiencies of the related art.

In accordance with one or more embodiments of the present invention, there is provided a first material selection system comprising: (i) a rating module, (ii) a rating database and (iii) a selection module. The rating module comprises an excitation device configured to act upon each of a plurality of material samples; a vibration receiver in cooperation with the excitation device; a rating computer coupled to the vibration receiver, the rating computer configured to execute stored instructions for determining a set of material sample ratings based on a fast Fourier transform ("FFT") analysis of data collected by the vibration receiver; and an output device operatively coupled to the rating computer, the output device configured to output the determined set of material sample ratings.

The rating database is configured to receive and store a plurality of sets of material sample ratings. Each set of material sample ratings is associated with a material sample.

The selection module comprises a selection computer coupled to the database and a user interface. The selection computer is configured to execute stored instructions for selecting a specific material sample based on user-preferred material characteristics. The user interface is configured to receive the user-preferred material characteristics; and transmit an identification of the selected specific material sample.

The rating computer of the first material selection system may determine a Galloup Base 10 Ratio.

The rating computer of the first material selection system may determine a Base Scaled Ratio.

The rating computer of the first material selection system may determine a deflection prediction.

The rating computer of the first material selection system may determine a mass prediction.

In accordance with one or more embodiments of the present invention, there is provided a second material selection system comprising: (i) an excitation device configured to act upon material sample; (ii) a vibration receiver in cooperation with the excitation device; (iii) a rating computer coupled to the vibration receiver; and (iv) an output device operatively coupled to the rating computer.

The rating computer is configured to execute stored instructions for determining a set of ratings associated with the material sample. The set of ratings may include material sample ratings based on FFT analysis of data collected by the vibration receiver. The output device is configured to output the determined set of material sample ratings.

The second material selection system may further comprise: (v) a rating database and (vi) a selection module. The rating database is configured to receive and store a plurality of sets of material sample ratings. Each set of material sample ratings is associated with a material sample. The selection module comprises a selection computer coupled to the database; and a user interface. The selection computer is configured to execute stored instructions for selecting a specific material sample based on user-preferred material characteristics. The user interface is configured to receive the user-preferred material characteristics; and transmit an identification of the selected specific material sample.

BRIEF DESCRIPTION OF THE DRAWINGS

The invention will now be described, by way of example, with reference to the accompanying drawings, which are incorporated in and constitute a part of the specification, in which:

FIGS. 11-15 depict various screens presented by the graphical user interface ("GUI") of the example material selection system.

Figure 1:
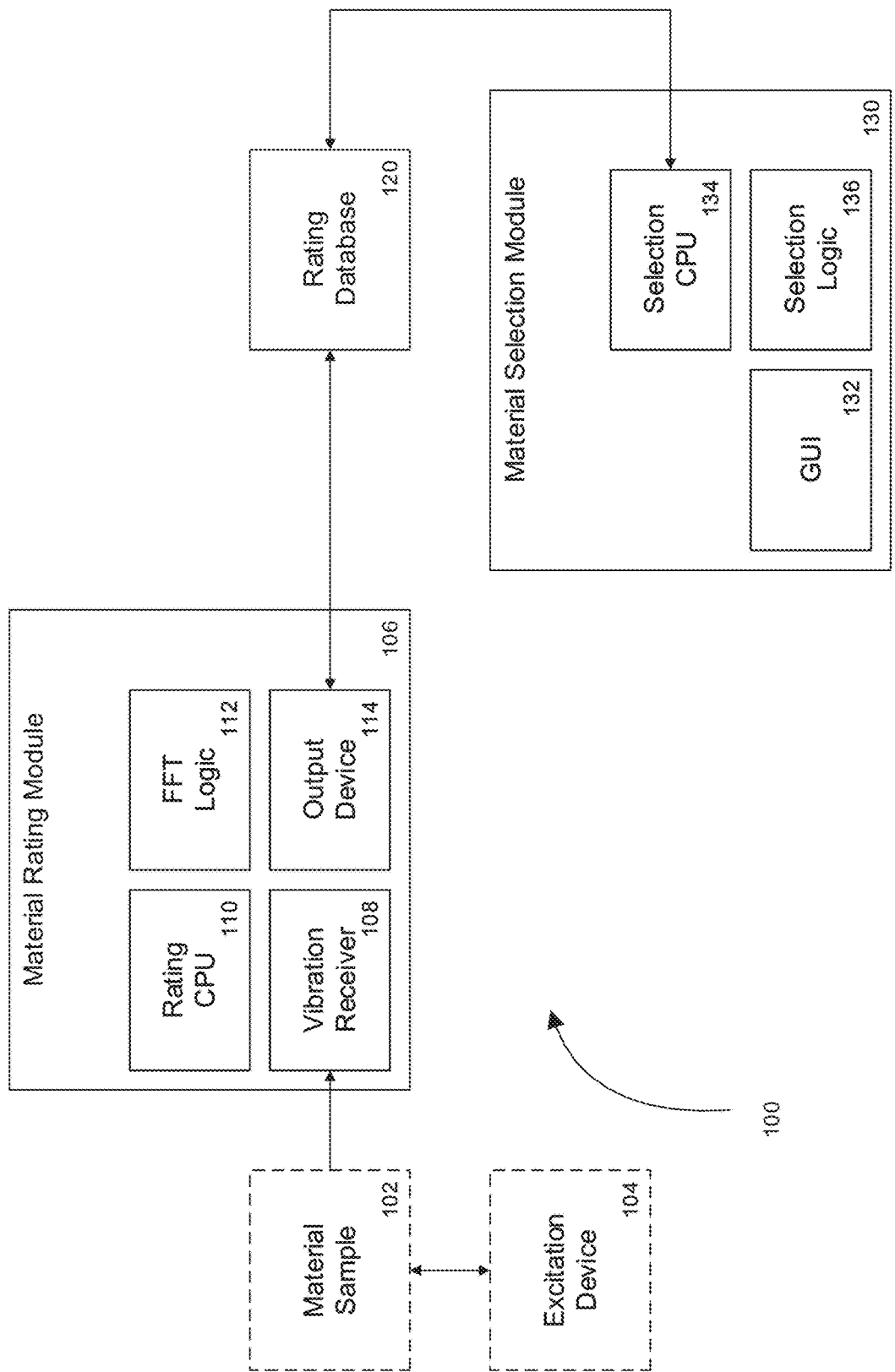
FIG. 1 is a schematic block diagram of an example material selection system.
Figure 2:
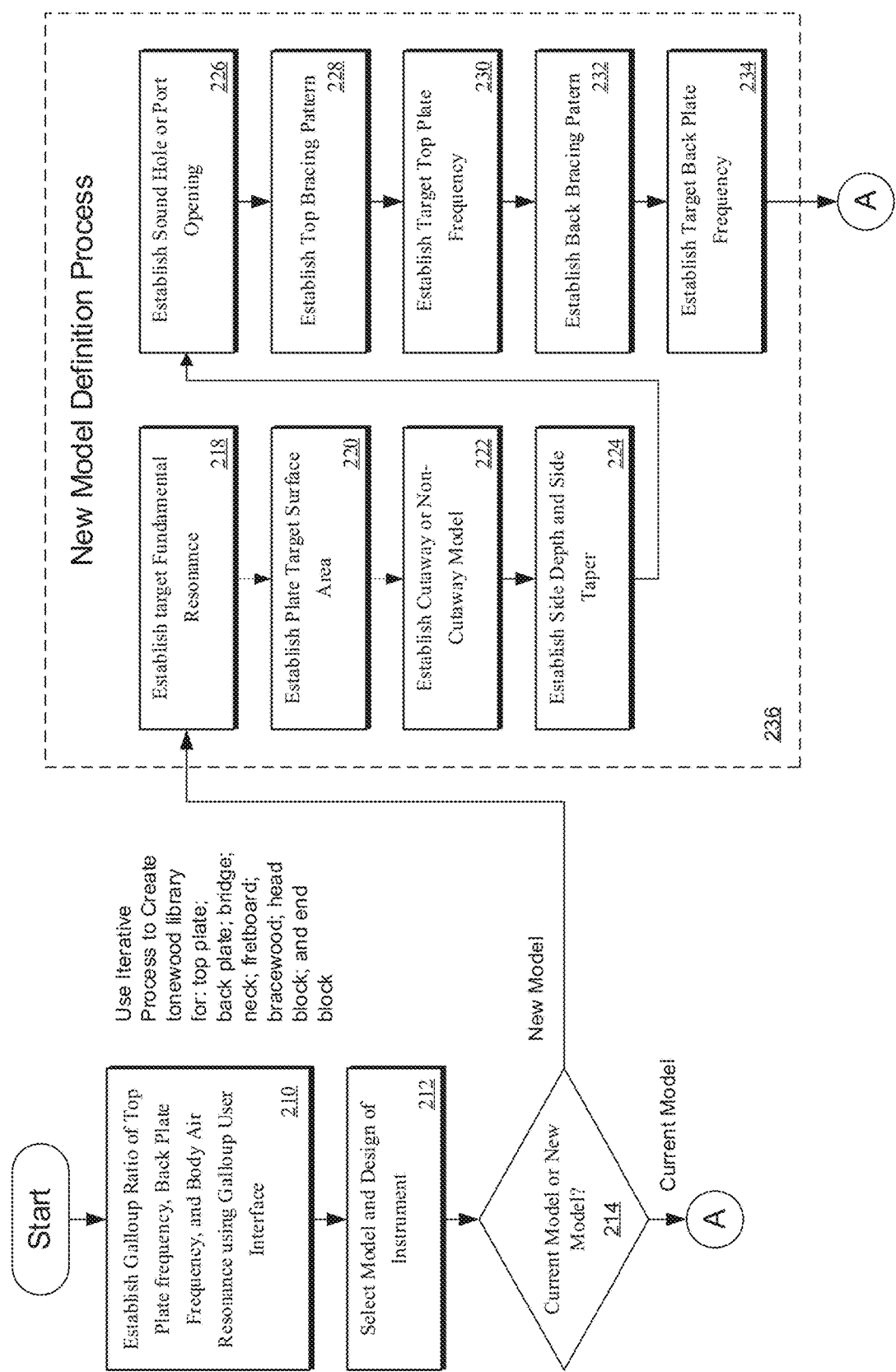
FIGS. 2-10 depict steps of an example method for constructing a musical instrument using the example material selection system.
Figure 3:
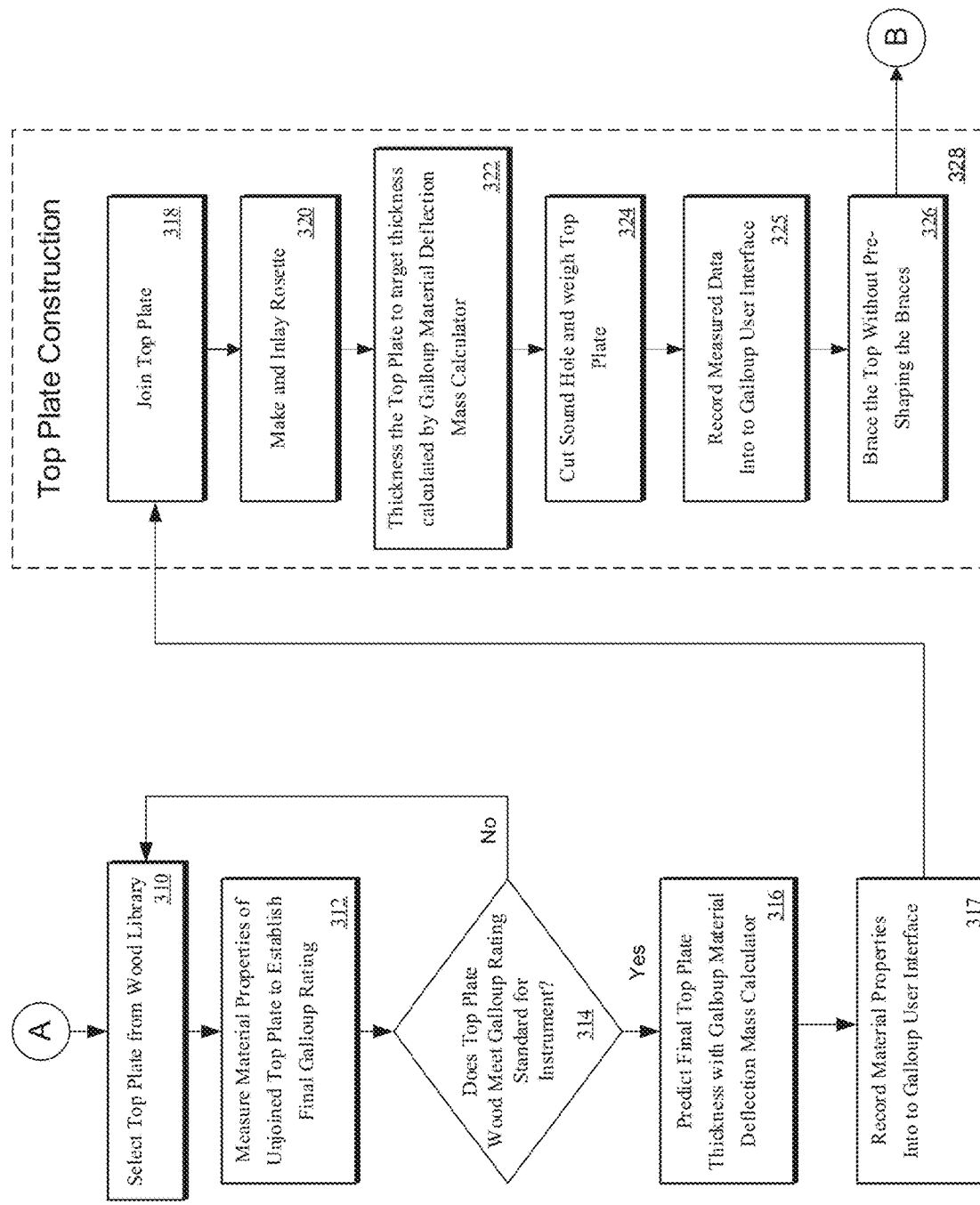
Figure 4:
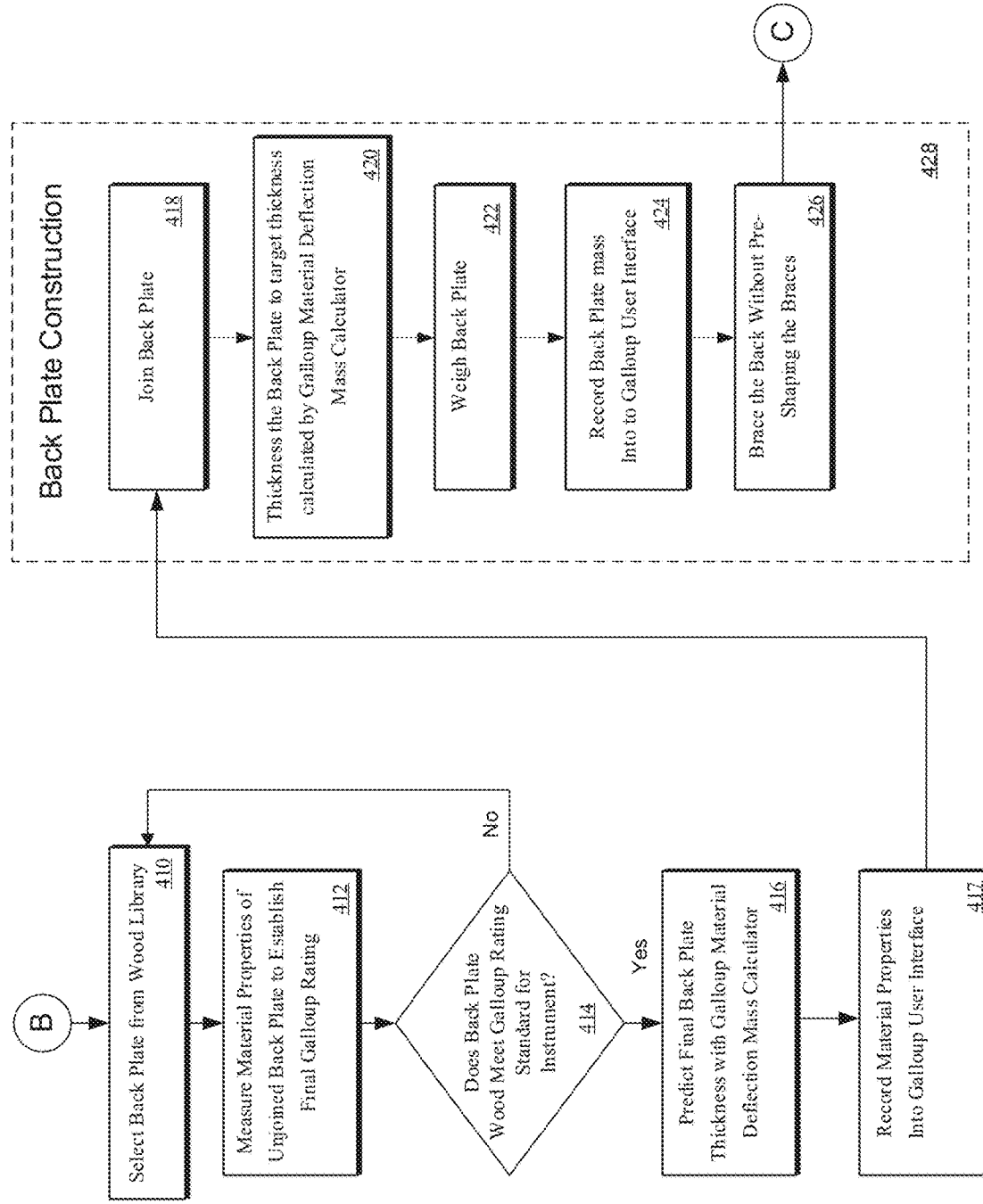
Figure 5:
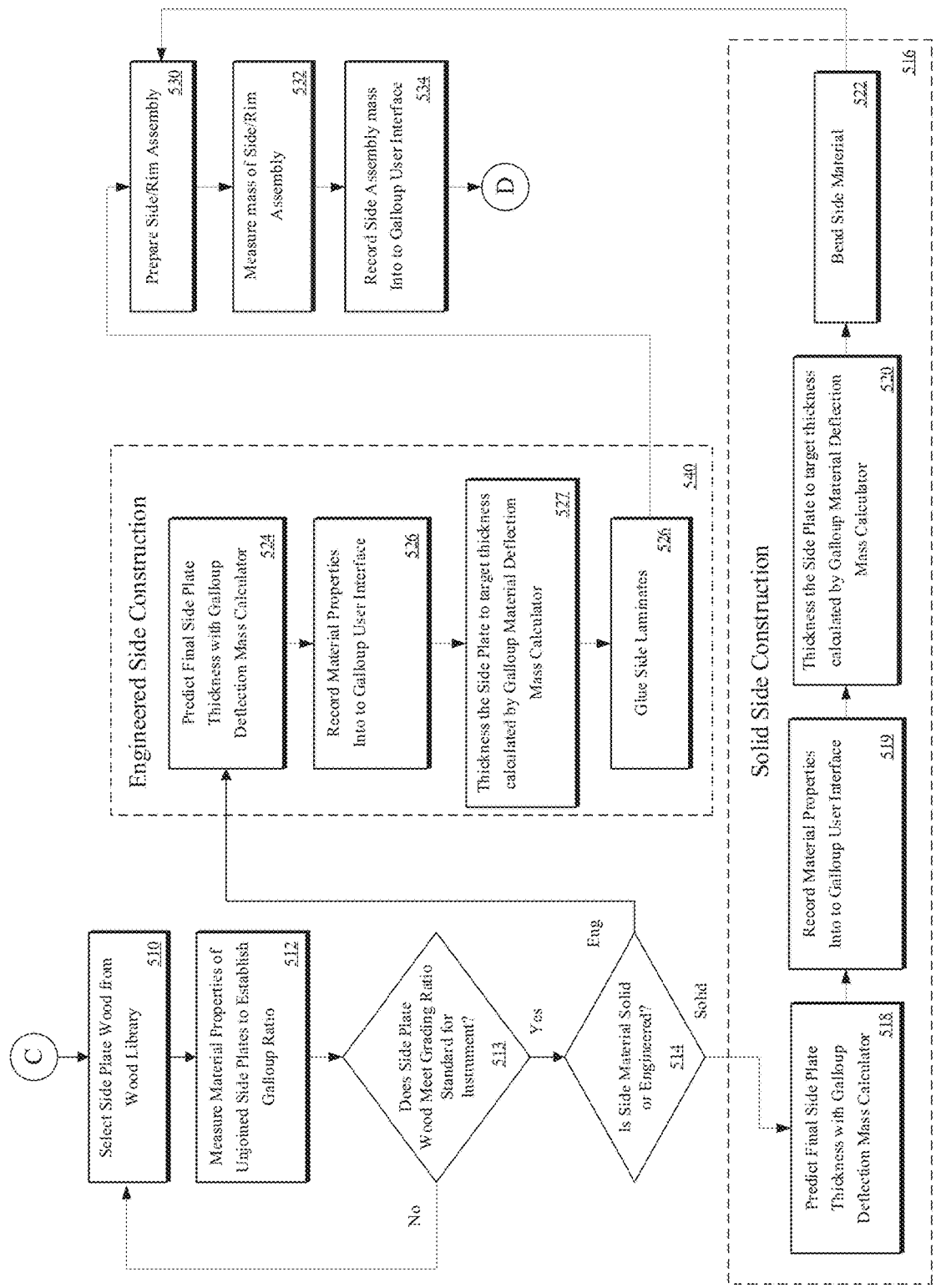
Figure 6:
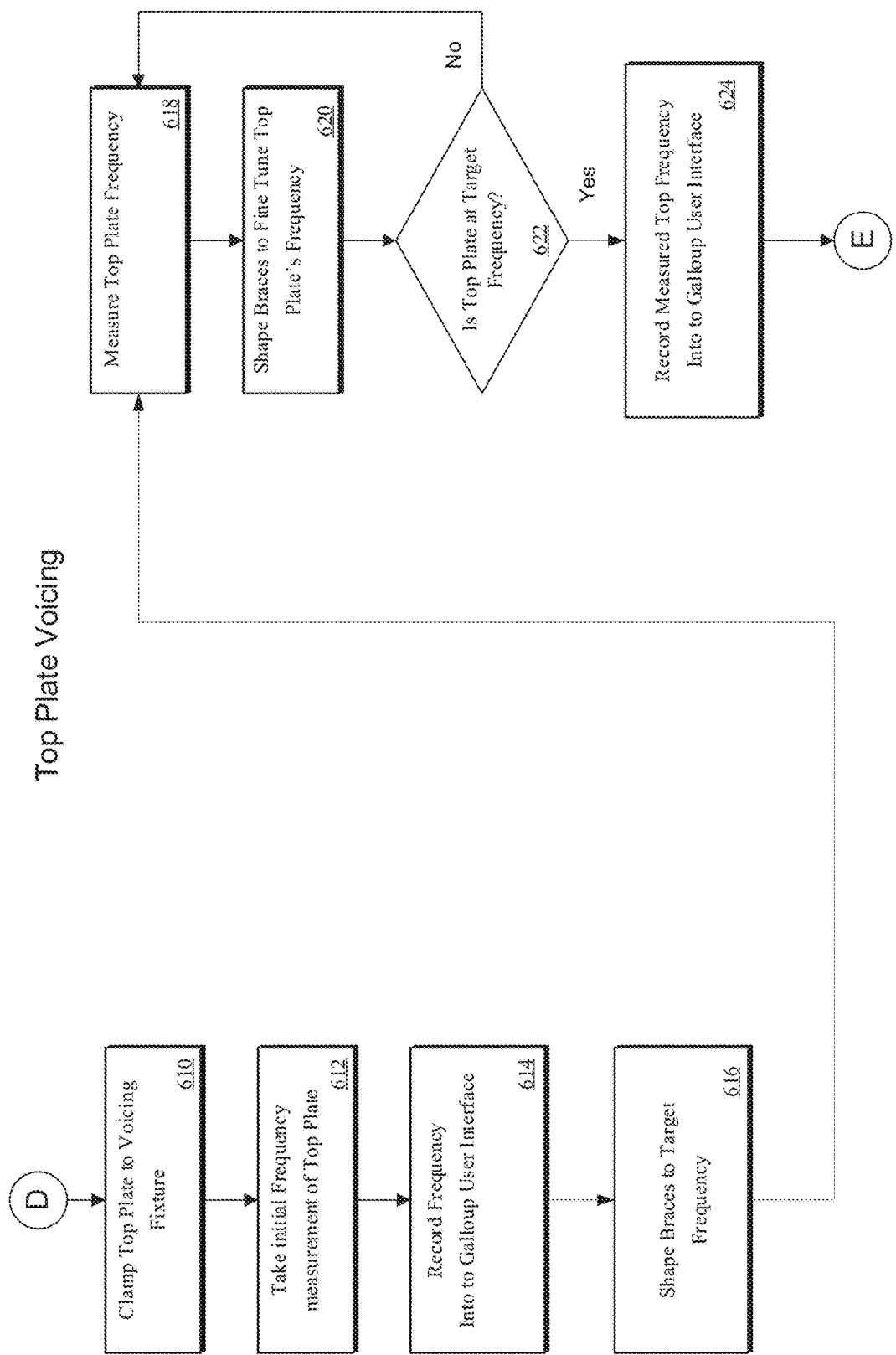

DRAWING REFERENCE NUMERALS
The following reference characters identify
the associated elements depicted in
the drawings describing the present invention:

| 100 | Material Selection System | 106 | Material Rating Module |
|---|---|---|---|
| 102 | Material Sample | 108 | Vibration Receiver |
| 104 | Excitation Device | 110 | Rating CPU |
| 112 | FFT / Rating Logic | 210- | Steps of the Example Method |
| 114 | Output Device | 1018 | For Constructing A Musical |
| 120 | Rating Database | | Instrument |
| 130 | Material Selection Module | 1100 | First Screen Image |
| 132 | GUI | 1200 | Second Screen Image |
| 134 | Selection CPU | 1300 | Third Screen Image |
| 136 | Selection Logic | 1400 | Fourth Screen Image |
| | | 1500 | Fifth Screen Image |

DETAILED DESCRIPTION

To address the deficiencies of the prior art, the present application discloses a material rating system, a material selection system, a method for rating material and a method for selecting material for constructing a musical instrument.

As shown in FIG. 1, there is illustrated an example material selection system 100. Material selection system 100 generally includes three elements: a material rating module 106; a rating database 120 and a material selection module 130.

The material rating module 106 rates a material sample 102 based on characteristics exhibited upon the sample's interaction with excitation device 104. Material rating system 100 comprises a vibration receiver 108, a rating central processing unit ("CPU") 110, FFT and rating Logic 112, and an output device 114. The vibration receiver (e.g., a microphone or other type of vibration sensor) detects and receives vibrations generated by the material sample 102 upon interaction with the excitation device 104. For example, the excitation device may constitute a shaker device for exciting the material sample. The detected vibrations are analyzed by rating CPU 110 which processes the vibrations in accordance with fast Fourier transform ("FFT") logic and other rating logic 112. The ratings processed by the CPU 110 and FFT logic 112 are transmitted by output device 114 (e.g., an output port) to the rating database 120. For example, the material sample ratings in the rating database 120 may comprise the different ratings included in the "Search by Ratings" section of the screen image 1200 in FIG. 12, such as "Galloup Rating Twist (xy)", "Galloup Rating Long (x)", "Galloup Rating Cross (y)", etc.

Upon successively employing material rating module 106 to rate a plurality of material samples 102 (e.g., wood board samples), rating database 120 is a repository of an inventory of samples that may be used in the construction of a musical instrument. For example, the rating database 120 may comprise a plurality of board samples with different ratings and material parameters, such as "RC Long", "RC Cross", "RC Twist", etc. (e.g., see bottom section of the screen image 1200 in FIG. 12. Once rating database 120 has been sufficiently populated with ratings of a plurality of material samples, it may be used in conjunction with material selection module 130 to determine an advantageous selection of materials with which to construct a musical instrument.

Material selection module 130 comprises a Graphical User Interface ("GUI") through which it collects and reports information pertaining to the material selection process. The information collected and reported by the GUI 132 is more specifically depicted in FIGS. 11 and 13. Upon collecting information from a user via the GUI 132, selection CPU 134 processes the information in accordance with selection logic 136. Upon processing the information, the selection CPU 134 reports to the user a preferred selected material sample via the GUI 132. For example, with reference to the "Search Calibration Values", "Search by Ratings", "Search by Source", and "Search by Density" sections of the screen image 1200 in FIG. 12, the selection CPU 134 may select the material sample (e.g., a wood board) based upon a plurality of different selection criteria, such as frequency and/or dimensional parameters of the wood board, rating parameters associated with the wood board, source criteria associated with the wood board, and/or density parameters of the wood board.

The FFT and rating Logic 112 processed by the rating CPU 110 utilizes the following input measurements and performs the following calculations:

1. Material sample dimensions are measured. Specifically, length, width and thickness of the sample are measured. Length and width measurements may be rounded to the nearest 0.010" and thickness may be averaged from 15 points across the sample to the nearest 0.001".

2. The mass of the material sample is measured using an accurate scale. For example, mass may be measured to the nearest 0.1 of a gram.

3. Other characteristics of the sample are measured. For example, long, cross, and twisting sample modes may be measured. Using FFT software, the three fundamental modes of the sample may be measured to the nearest 0.1 hz.

4. Sample density may be calculated using the measurements outlined in step 1 and 2. Density may be calculated in lbs/ft$^3$ and kg/m$^3$.

5. Young's Modulus along the grain may be calculated as follows:

$$Ex=((d*Lx^4*fx^2)/(384*1.05*h^2))$$

d=density (lbs/in3)
Lx=length of plate with the grain (inches)
fx=frequency of (0,2) mode (hz)
h=thickness of plate (inches)

6. Young's Modulus across the grain may be calculated as follows:

$$Ex=((d*Ly^4*fy^2)/(384*1.05*h^2))$$

d=density (lbs/in3)
Ly=length of plate across the grain (inches)
fy=frequency of (2,0) mode (hz)
h=thickness of plate (inches)

7. Twisting modulus (Shear modulus)

$$=(d*(Ly^2)*(Lx^2)*(fxy^2))/(384*1.05*(h^2))$$

d=density (lbs/in3)
Ly=length of plate across the grain (inches)
Lx=length of plate with the grain (inches)
fxy=frequency of (1,1) mode (hz)
h=thickness of plate (inches)

8. The speed of sound along each axis may be calculated as follows:

$$S=\sqrt{(E/d)}$$

S=speed of sound (m/sec)
E=modulus of elasticity (N/m$^2$)
d=density (kg/m$^3$)

Modulus values may be converted from standard (psi) to metric (N/m$^2$) by multiplying by 6895.

9. The radiation coefficient for each axis may be calculated as follows:
Rc=Speed of sound along an axis/density
Sx=Speed of sound along an axis (m/sec)
d=Density (kg/m^3)

10. A "Galloup Base 10 Ratio" may also be calculated. The Galloup Base 10 Ratio is set by establishing a hypothetical "best" value for a sample and scaling it to the number ten. All real values are then scaled to match the base ten ratio. For the Galloup Base 10 Ratio along the grain, a value of 14 m○4/kg·s may be considered as the theoretical maximum. For the Galloup Base 10 Ratio across the grain, a value of 4 m○4/kg·s may be considered the theoretical minimum.

11. A Base Scaled Ratio may also be calculated. The Base Scaled Ratio takes into account the material properties of the material sample (e.g., a wood board sample) where weight and stiffness affects the values.

In addition to the above described calculations, material rating CPU 110 may also calculate a Deflection Mass value.

A method for arriving at the plate's final thickness is useful to help standardize the performance of a finished guitar. This is accomplished by thinning the joined plate to a stiffness criterion as opposed to an arbitrary thickness. By loading the plate in the center of a known span with a known force and measuring the deflection, you are able to measure the stiffness of the plate. As the plate is thinned, a deflection reading is taken every 0.005" of material removed and when the desired amount of deflection is reached, the plate is said to be at its final thickness.

If the modulus of elasticity is known, it is possible to predict the amount of deflection before the plate has been joined, thus saving the need to physically deflect each top. The amount of deflection may be predicted in each plate every 0.001" of thickness.

If the density is known, it is possible to calculate the amount of mass a plate will have at its final thickness or its effective density. If the effective density or mass per square inch is known, the total mass of the top plate for any guitar with a known surface area may be predicted.

For the Galloup method, a deflecting span of 18" is chosen for measurement along the grain and a deflecting span of 10" is chosen for measurement across the grain. A mass of 1330 g is the load and the deflection is measured in the center of the span. The plate halves should be joined and dimensioned to 16" wide and 22" long To predict the deflection, the material rating CPU 110 may use the equation for static determination of modulus of elasticity along the grain:

$$Ex=((0.25*W*Lx^3)/(y*Ly*h^3))$$

Where:
Ex=modulus along the grain
W=Force applied to plate (lbs)
Lx=Distance between fixed supports perpendicular to grain (inches)
y=Deflection (inches)
Ly=width of plate perpendicular to Lx (inches)
h=Thickness of plate (inches)

This equation may be rearranged to solve for y (deflection) giving:

$$y=(0.25*W*Lx○3)/(Ex*Ly*h○3)$$

The amount of deflection is then predicted for every 0.001" of thickness removed starting at 0.135" through 0.070"

Predicting the mass/in^2 (effective density)
Effective density=d*h where:
d=Density (g/in^3)
h=thickness (in)

Mass/in^3 is predicted for every 0.001" of thickness removed starting at 0.135" through 0.070".

By multiplying the density by the total surface area of the guitar face, one can predict the overall mass of the top plate at its final thickness.

According to one aspect of the present application, employing FFT allows the system to determine peaks in the frequency content of the material/wood and ensure improved strength to weight ratio. Generally, the system of the present application: 1) Determines the dimensions and weight of the material, including, for example, inputting L, W, thickness in software; 2) Determines the frequency content of the wood, for example, as recorded by a microphone; 3) Provides ability to manually enter/load in frequencies in the software 35.0 Hz/69.0 Hz/125 Hz; 4) Provides ability for user to initiate calculation, such as using the "Calculate" button in a GUI (see e.g., FIG. 11).

The Galloup rating and prediction provides a mechanism for a user to determine a relative quality of a sample. According to one example scale, a rating of 15=superior wood rating, and a rating of 10=Very good top. Generally, ratings above 10 are preferable.

Figure 7:
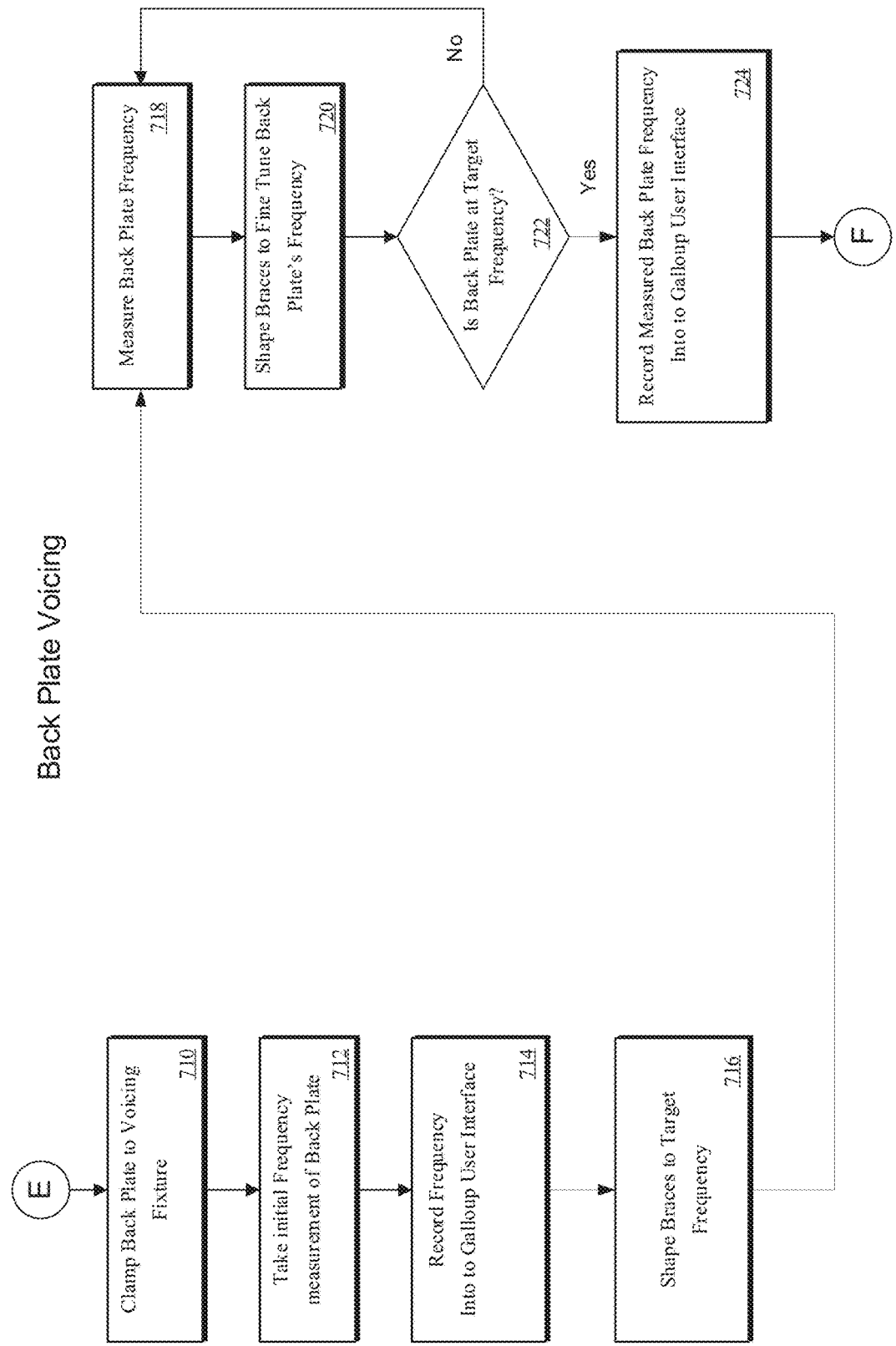
Figure 8:
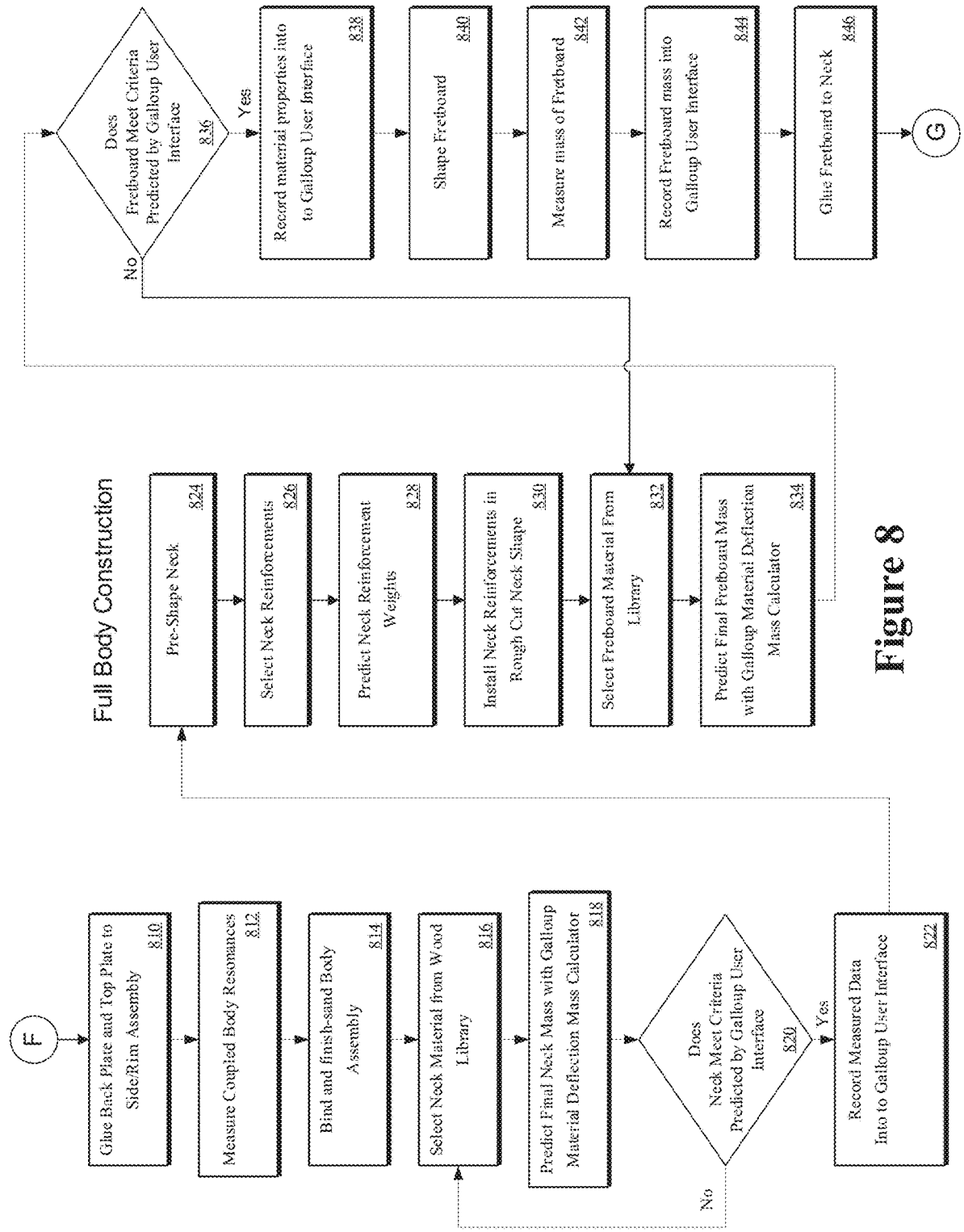
Figure 9:
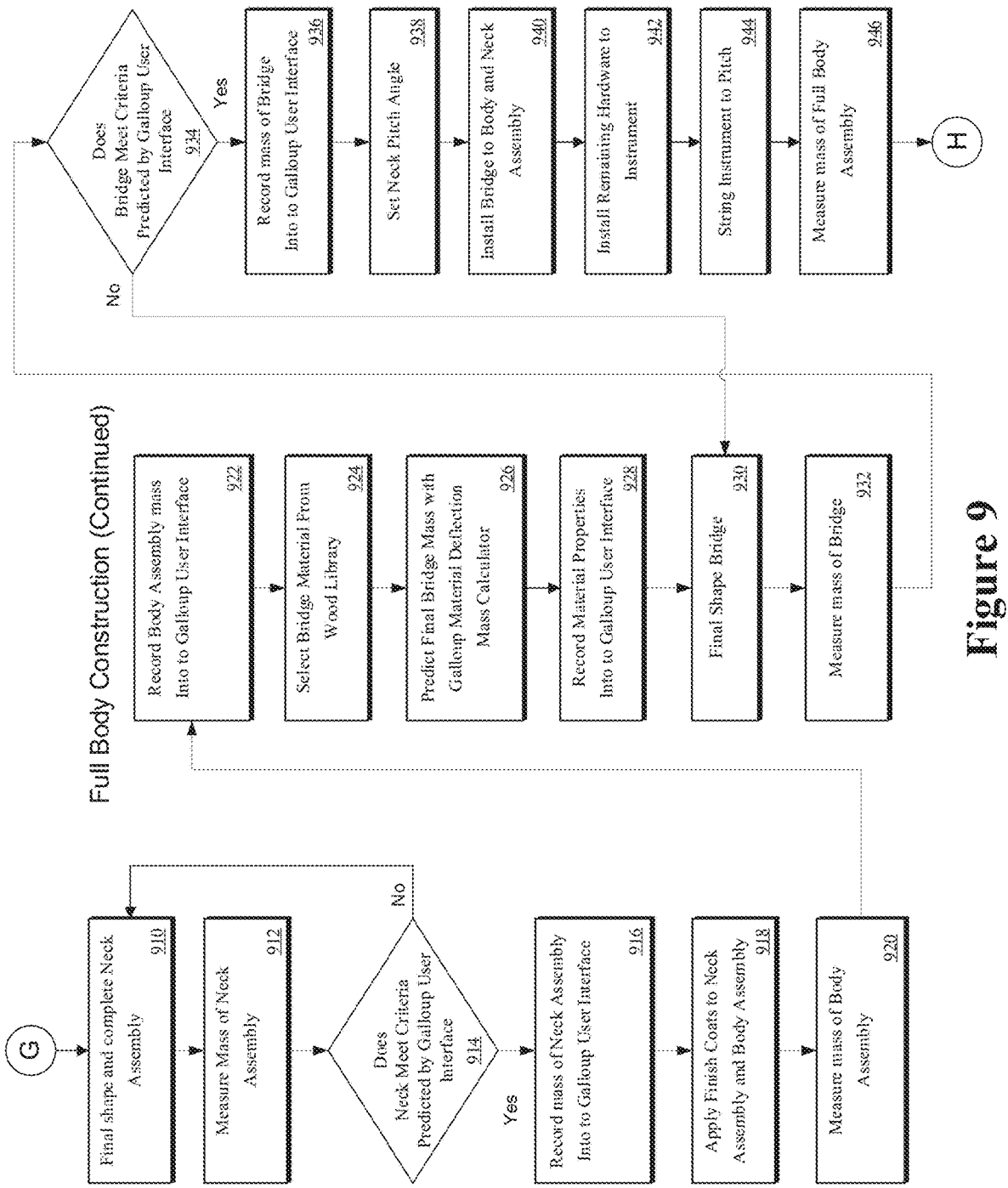
Figure 10:
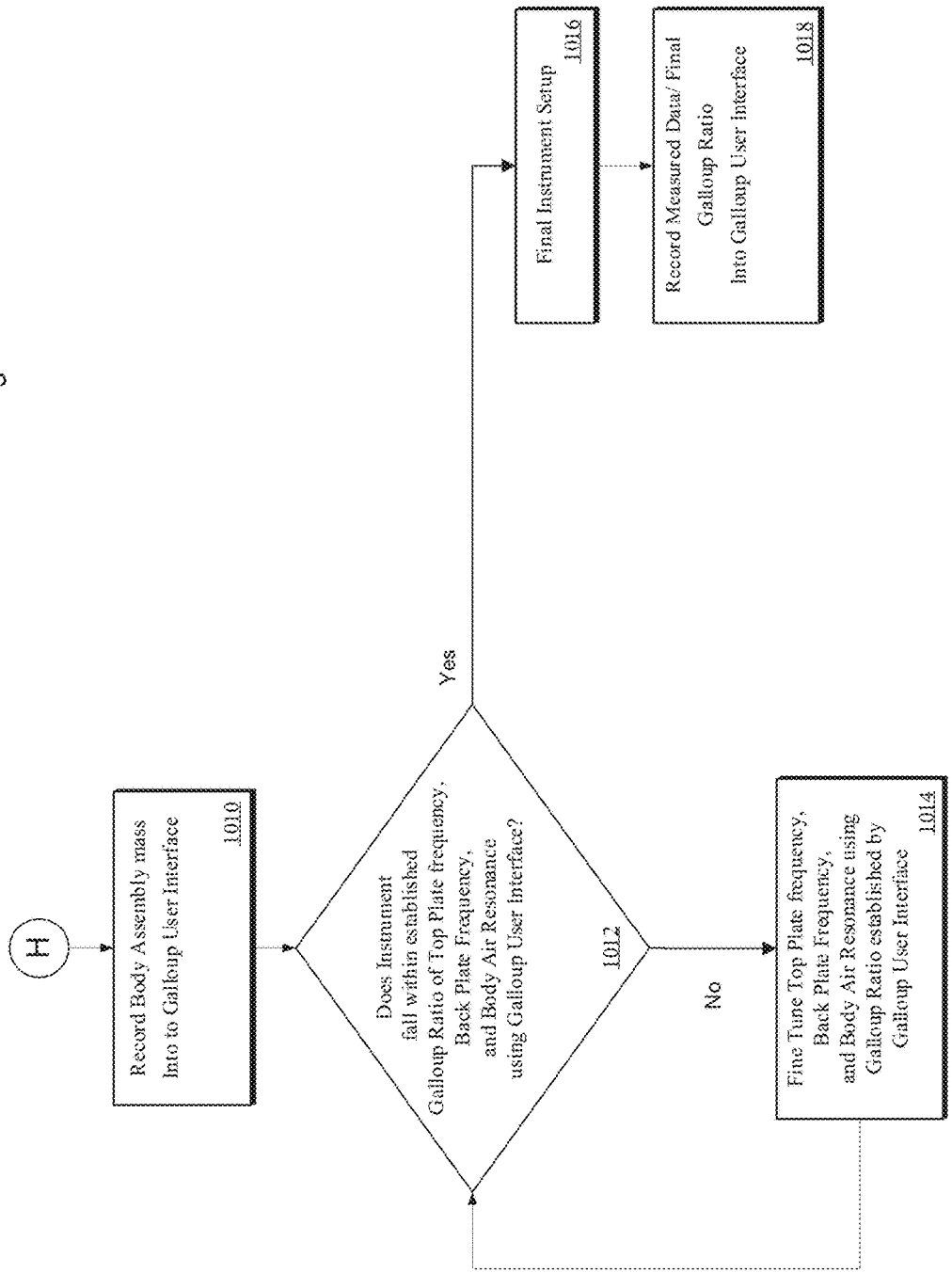

In the flowcharts presented in FIGS. 2-10, the steps of an example method for constructing a musical instrument are described. The method begins at step 210 in FIG. 2, and then, in step 214, it is determined if a current or new model of the instrument is to be used. If it is determined in step 214 that a new model of the instrument is to be used, then steps 218-234 of the new model definition process 236 are carried out before steps 310-317 in FIG. 3. Conversely, if it is determined in step 214 that a current model of the instrument is to be used, then the method proceeds to steps 310-317 in FIG. 3. After the completion of step 317 in FIG. 3, steps 318-326 of the top plate construction process 328 are performed. After the top plate construction steps have been performed, the method continues with steps 410-417 in FIG. 4. After the completion of step 417 in FIG. 4, steps 418-426 of the back plate construction process 428 are performed. Then, turning to FIG. 5, the method proceeds with steps 510-514. In step 514 of FIG. 5, it is determined if a solid side construction or an engineered side construction is to be used. If it is determined in step 514 that a solid side construction is to be used, then steps 518-522 of the solid side construction process 516 are carried out. Conversely, if it is determined in step 514 that an engineered side construction is to be used, then the method proceeds to steps 524-528 in FIG. 5. After which, steps 530-534 are carried out, and then the method continues with the top plate voicing steps 610-624 in FIG. 6. Then, following the top plate voicing steps 610-624 in FIG. 6, the back plate voicing steps 710-724 in FIG. 7 are performed. Next, after performing the back plate voicing steps 710-724, the full body construction steps 810-846 in FIG. 8 are carried out. The full body construction portion of the method continues with steps 910-946 in FIG. 9, and then the method concludes with the final resonance tuning steps 1010-1018 in FIG. 10.

Figure 11:
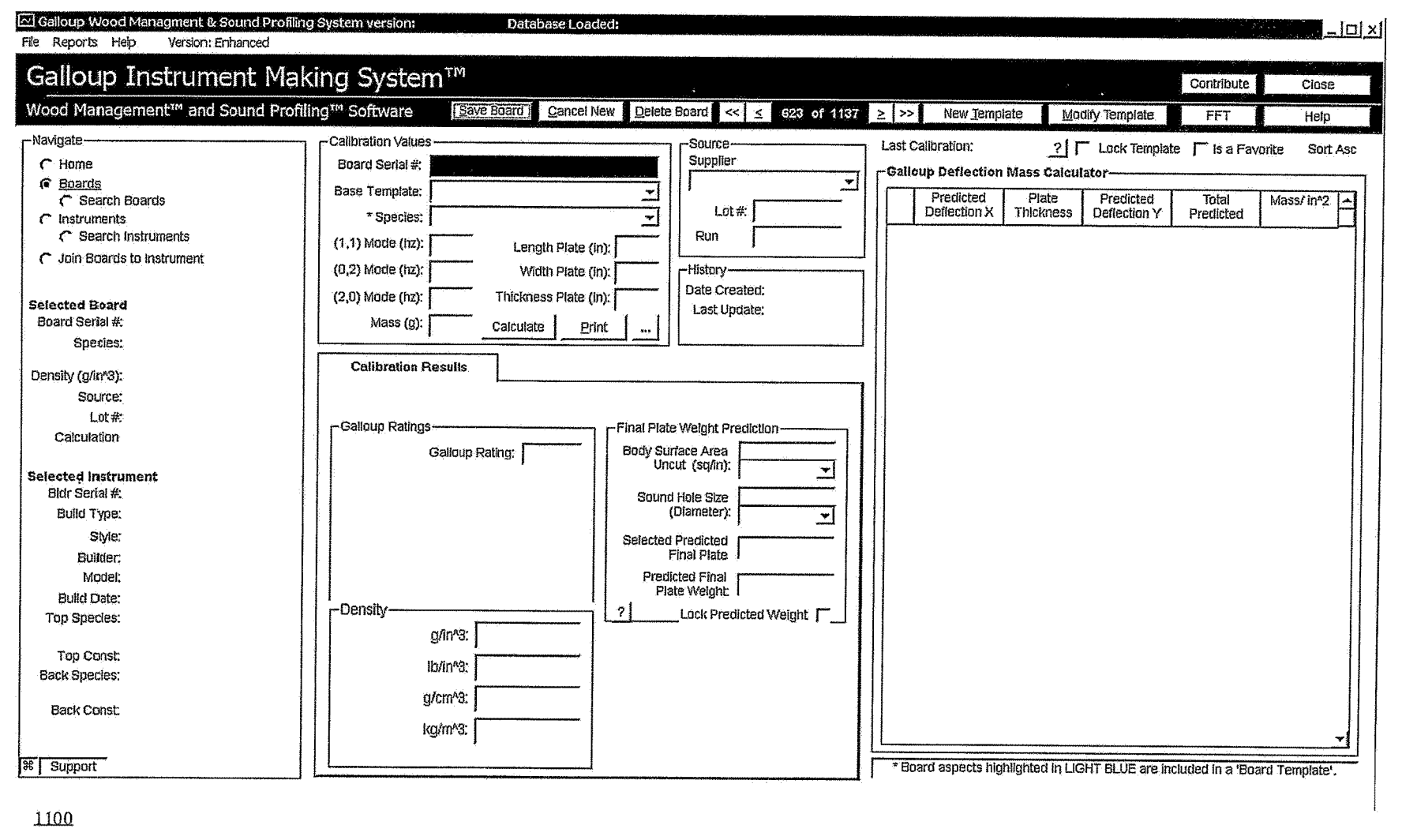

A first example screen 1100 presented by the graphical user interface ("GUI") 132 of the example material selection system 100 is shown in FIG. 11. This portion of the system software allows a user to enter the measured data and history of a new piece of wood. In turn, the system software determines the initial Galloup Rating, Density, Final Weight Prediction, and Predicted Deflection values in the Galloup Deflection Mass Calculator. Once saved, the board is now included in the library and can be searched/referenced in the future.

Figure 12:
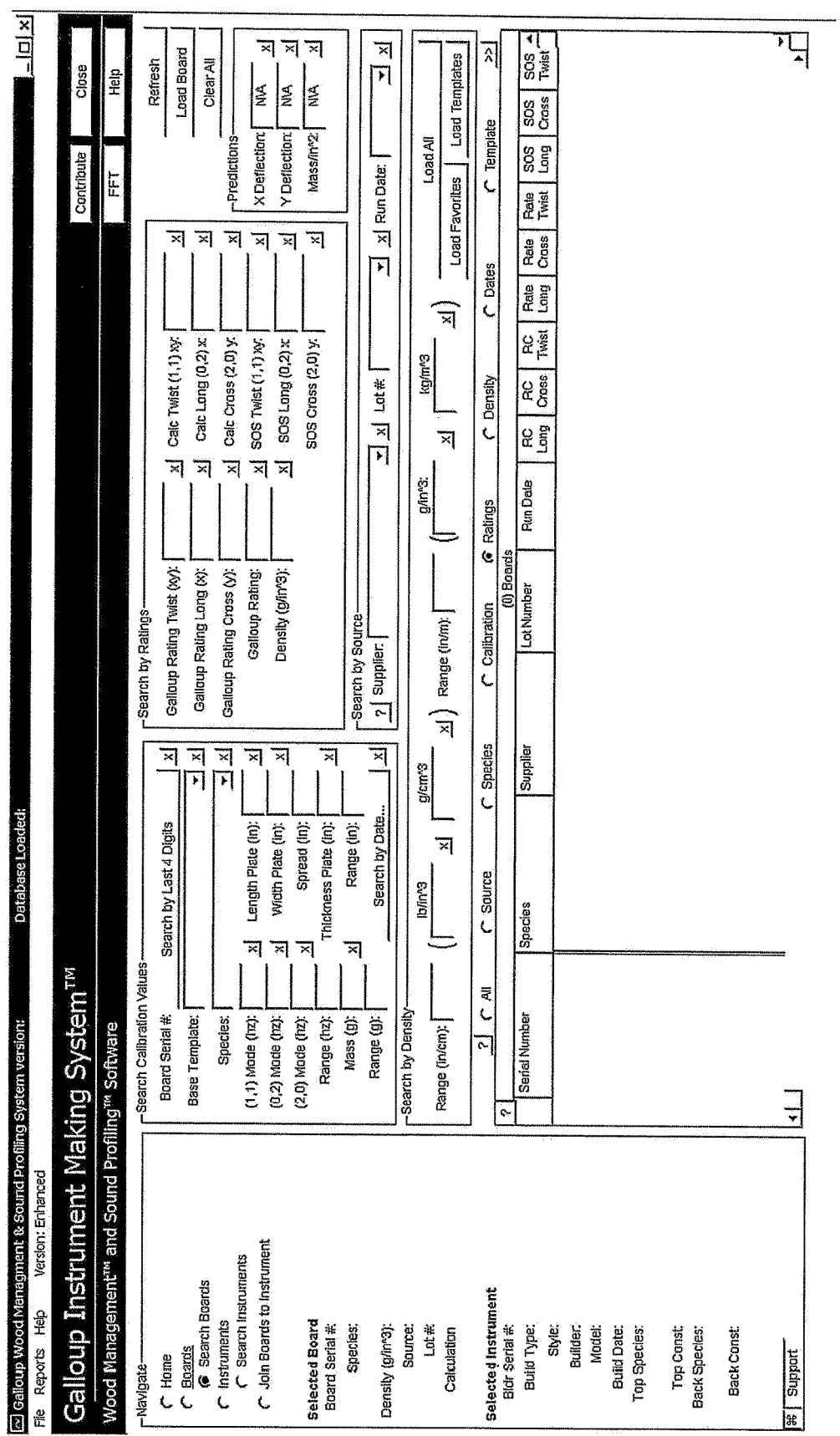

A second example screen 1200 presented by the graphical user interface ("GUI") 132 of the example material selection system 100 is shown in FIG. 12. This portion of the system software allows the user to search the "wood library" for a specific piece of wood based on the parameters entered. Parameters such as supplier, ratings, material properties, serial number, lot number, date, etc.

Figure 13:
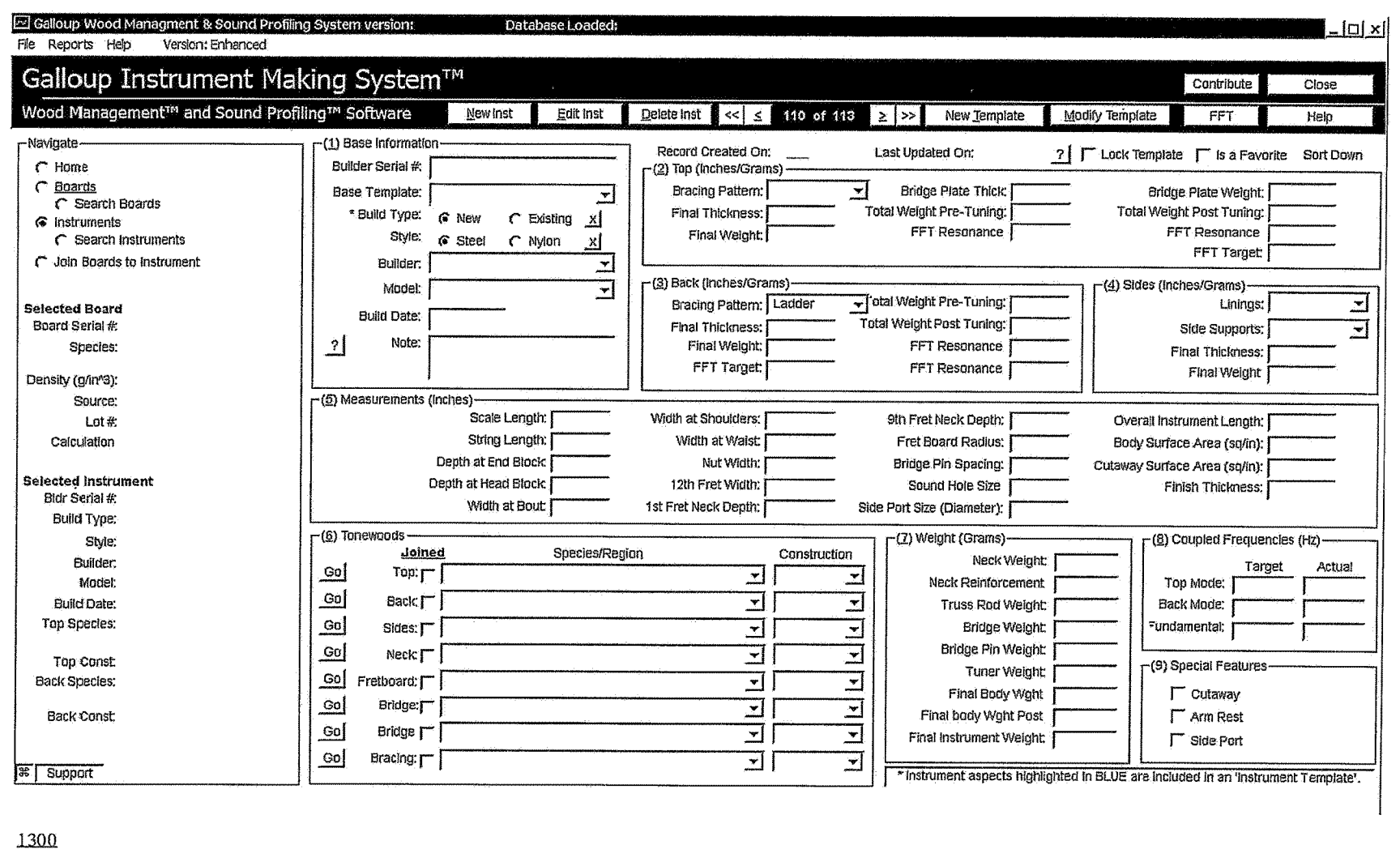

A third example screen 1300 presented by the graphical user interface ("GUI") 132 of the example material selection system 100 is shown in FIG. 13. This portion of the software allows the user to enter in all of the important data of an existing instrument or can be used as a template for a new instrument. Data includes size, shape, make, model, wood used, appointments, etc. Once the data is entered, it can be saved in the "instrument library" and can be accessed anytime as a reference for future builds.

Figure 14:
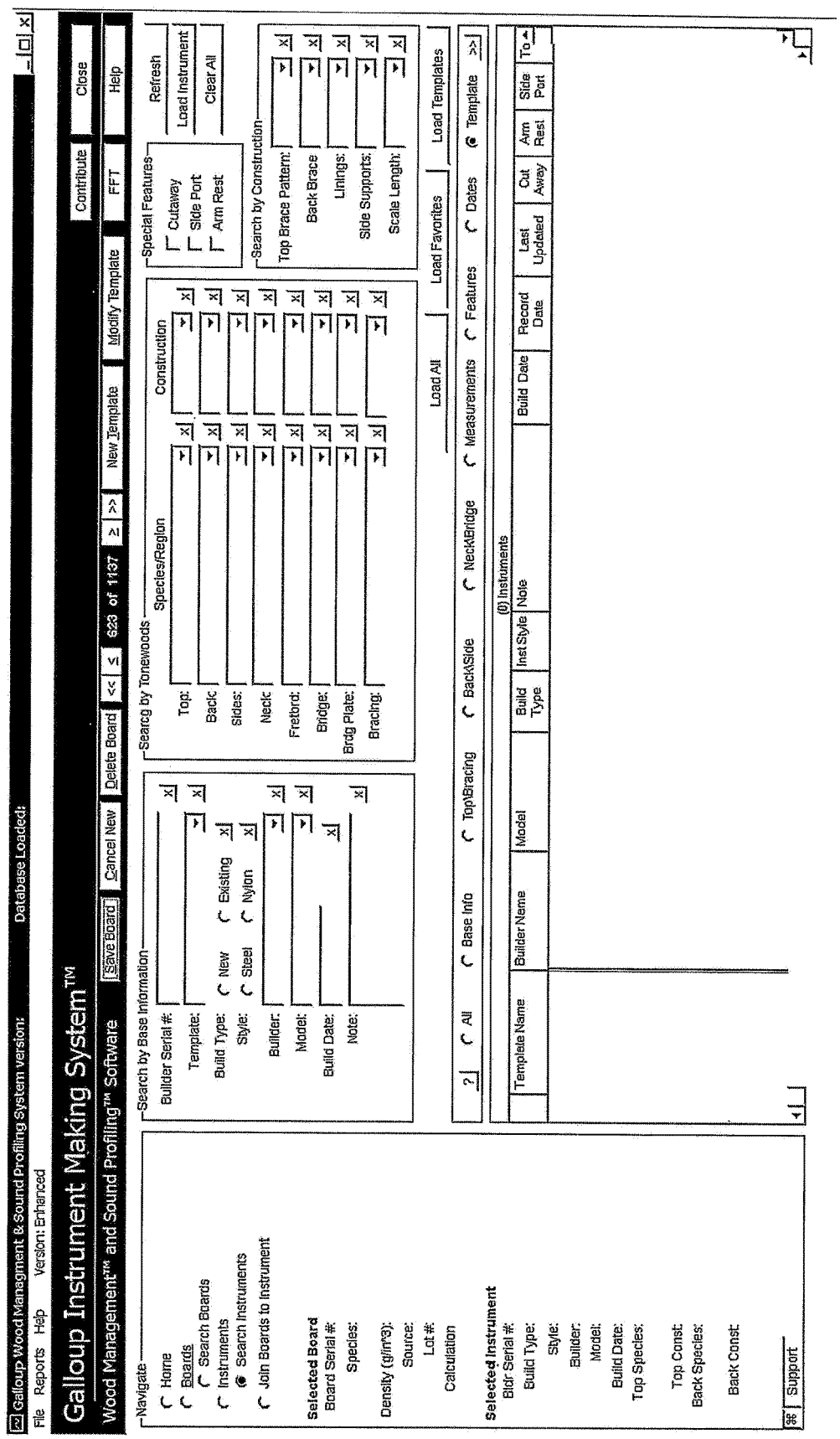

A fourth example screen 1400 presented by the graphical user interface ("GUI") 132 of the example material selection system 100 is shown in FIG. 14. This portion of the software allows the user to search the "instrument library" based on any of the information entered about the specific instrument(s) in mind.

Figure 15:
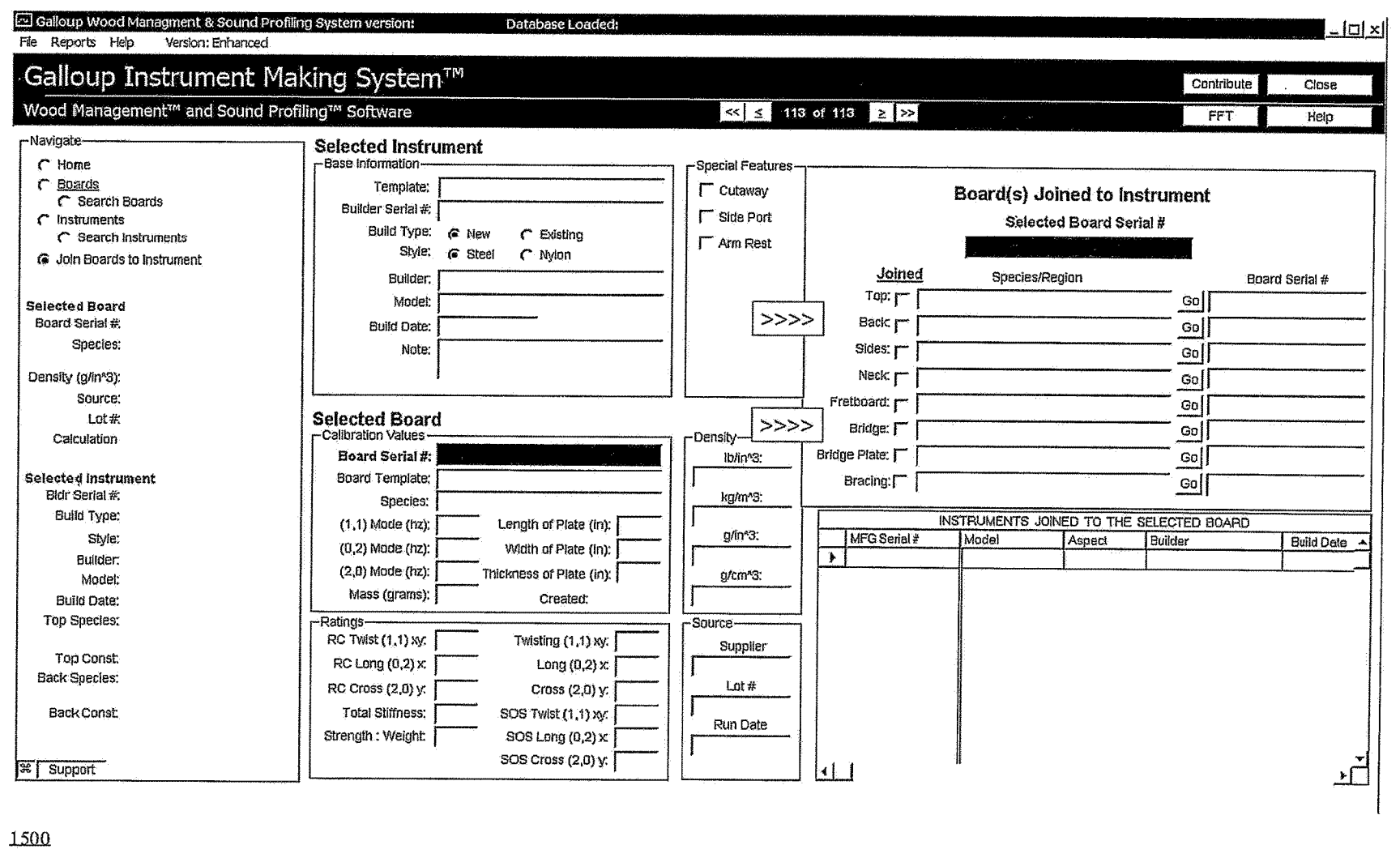

A fifth example screen 1500 presented by the graphical user interface ("GUI") 132 of the example material selection system 100 is shown in FIG. 15. This portion of the software allows the user to "join" or apply a piece of wood from the "wood library" to an instrument in the "instrument library". This ensures that, when a piece of wood is used in a build, it is categorized as such and the user knows it is no longer accessible for use on another instrument. It also allows the user to see what board(s) will work best for what instrument based on their preferences and system.

In one or more alternative embodiments, the material rating module 106, the rating database 120, and the material selection module 130 of the above-described system 100 may be incorporated in a single computer workstation or computing device.

While the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2d. Ed. 1995).

What is claimed is:

1. A material selection system for constructing a musical instrument and/or wherein a selected material is a wood material, comprising:
   a rating module comprising:
      an excitation device configured to act upon each of a plurality of material samples,
      a vibration receiver in cooperation with the excitation device,
      a rating computer coupled to the vibration receiver, the rating computer configured to execute stored instructions for determining a set of material sample ratings based on Fast Fourier Transform (FFT) analysis of data collected by the vibration receiver, the rating computer determining one or more modal frequencies for one or more respective frequency modes of the material samples based on the FFT analysis of data, the rating computer further determining one or more of the material sample ratings by: (i) establishing a hypothetical best value for a particular material parameter, (ii) scaling the hypothetical best value for the particular material parameter to a base number, and then (iii) scaling an actual material parameter value for the particular material parameter to the base number, the particular material parameter being computed as a function of the one or more modal frequencies determined by the FFT analysis of data; and
      an output device operatively coupled to the rating computer, the output device configured to output the determined set of material sample ratings;
   a rating database configured to receive and store a plurality of sets of material sample ratings, each set of material sample ratings associated with a material sample; and
   a selection module comprising:
      a selection computer coupled to the database, the selection computer configured to execute stored instructions for selecting a specific material sample based on user-preferred material characteristics, and
      a user interface configured to:
         receive the user-preferred material characteristics; and
         transmit an identification of the selected specific material sample.

2. The material selection system of claim 1, wherein the base number to which the rating computer scales the hypothetical best value and the actual material parameter value for the particular material parameter is base 10, and the rating computer determines a Galloup Base 10 Ratio.

3. The material selection system of claim 1, wherein the rating computer determines a deflection prediction, the deflection prediction being computed as a function of a static modulus of elasticity, the deflection prediction obviating a need for physically deflecting each of the material samples.

4. The material selection system of claim 1, wherein the rating computer determines a mass prediction.

5. A material selection system for constructing a musical instrument and/or wherein a selected material is a wood material, comprising:
   an excitation device configured to act upon a material sample,
   a vibration receiver in cooperation with the excitation device,
   a rating computer coupled to the vibration receiver, the rating computer configured to execute stored instructions for determining a set of ratings associated with the material sample, the set of ratings including:
   material sample ratings based on Fast Fourier Transform (FFT) analysis of data collected by the vibration receiver, the rating computer determining one or more modal frequencies for one or more respective frequency modes of the material samples based on the FFT analysis of data, the rating computer further determining one or more of the material sample ratings by: (i) establishing a hypothetical best value for a particular material parameter, (ii) scaling the hypothetical best value for the particular material parameter to a base number, and then (iii) scaling an actual material parameter value for the particular material parameter to the base number, the particular material parameter being computed as a function of the one or more modal frequencies determined by the FFT analysis of data; and
   an output device operatively coupled to the rating computer, the output device configured to output the determined set of material sample ratings.

6. The material selection system of claim 5, further comprising:
   a rating database configured to receive and store a plurality of sets of material sample ratings, each set of material sample ratings associated with a material sample; and
   a selection module comprising:
      a selection computer coupled to the database, the selection computer configured to execute stored instructions for selecting a specific material sample based on user-preferred material characteristics, and
      a user interface configured to:
         receive the user-preferred material characteristics; and
         transmit an identification of the selected specific material sample.

7. The material selection system of claim 5, wherein the base number to which the rating computer scales the hypothetical best value and the actual material parameter value for the particular material parameter is base 10, and the rating computer determines a Galloup Base 10 Ratio.

8. The material selection system of claim 5, wherein the rating computer determines a deflection prediction, the deflection prediction being computed as a function of a static modulus of elasticity, the deflection prediction obviating a need for physically deflecting each of the material samples.

9. The material selection system of claim 5, wherein the rating computer determines a mass prediction.

* * * * *